United States Patent [19]
Mikkelsen

[11] 3,932,244
[45] Jan. 13, 1976

[54] PRODUCTION OF CARBON LINING FOR REDUCTION CELLS

[75] Inventor: Anfinnur Mikkelsen, Kitimat, Canada

[73] Assignee: Alcan Research and Development Limited, Montreal, Canada

[22] Filed: Dec. 19, 1973

[21] Appl. No.: 426,136

[52] U.S. Cl. .................. 156/71; 204/67; 204/243; 204/294; 260/28; 260/37 R; 427/104; 427/122
[51] Int. Cl.² .................. C08L 71/06; C08L 95/00; C25B 11/12; C25C 3/06
[58] Field of Search............ 260/28, 37 R; 204/294, 204/67, 243; 156/71; 427/122

[56] References Cited
UNITED STATES PATENTS 3,375,132  3/1968  Geise .................................. 204/294
3,635,408  1/1972  Williams ............................ 204/294

*Primary Examiner*—Allan Lieberman
*Attorney, Agent, or Firm*—Cooper, Dunham, Clark, Griffin & Moran

[57] ABSTRACT

In making carbon bodies for lining aluminum reduction cells, an aggregate including carbon recovered from used linings of such cells is mixed with binder material incorporating an alkaline-catalyzable furan binder. Residual contaminant material in the recovered carbon acts as a catalyst for the furan binder, so that the binder-aggregate mixture constitutes a self-hardening carbon lining body.

14 Claims, No Drawings

PRODUCTION OF CARBON LINING FOR REDUCTION CELLS

BACKGROUND OF THE INVENTION

This invention relates to the manufacture of carbon bodies for lining aluminum reduction cells, e.g. of the type wherein aluminum metal is produced from alumina by electrolysis of a fused electrolyte (frequently referred to as a bath) containing alumina and cryolite. More particularly, the invention is directed to methods of making lining bodies (including blocks and monolithic linings) incorporating carbon recovered from spent or used linings of such cells.

In a typical aluminum reduction cell (often called a pot), the carbon lining or potlining comprises a carbon structure which constitutes the interior side walls and bottom of the cell and is disposed as a very thick lining in a steel shell. This carbon lining functions as the cathode of the pot, usually by virtue of electrical connection to a multiplicity of steel cathode bars or the like embedded in the bottom portion, and as a result of current passed from one or more carbon anodes that extend downwardly into the bath, molten aluminum collects over the bottom and is withdrawn from time to time. The lining may be constructed of preformed carbon blocks, conventionally called prebake block, joined together with a carbon mix (e.g. particulate carbon with a suitable binder), or it can be made entirely of carbon mix suitably pressed into place, e.g. to form a completely monolithic structure, or it can be composed of various combinations of prebake blocks and monolithic carbon mass, for instance at different regions or layers.

Prebake blocks are conventionally formed by mixing a carbon aggregate with a conventional binder such as coal tar pitch or the like and hardening the mixture by baking in block form. Monolithic linings are made of similar mixtures also subjected to baking. Stated more generally, the lining (whether monolithic, or made wholly of partly of blocks) conventionally receives suitable heat treatment so that the carbon mix is baked in place and all the carbon becomes baked to a hard mass, before the cell is put in use.

During continuous operation of the reduction cell, the carbon lining is continually and progressively affected by the molten electrolyte and accompanying high temperature of the process, to the extent that the carbon lining absorbs a considerable quantity of material from the bath. Deterioration is an unavoidable consequence of the growth and disruption of the carbon structure, and final failure or near failure of the pot eventually occurs, being evidenced by such conditions as leakage of metal or molten bath, substantial distortion of the cathode structure, or iron pickup in the product metal. In particular, the carbon lining is penetrated by various materials and to varying degrees according to the age of the pot, the location of a given lining area in the sides or bottom and the specifically selected procedure and temperature of operation, as well as other factors.

The materials thus penetrating the lining may include molten metal, but chiefly comprise values (in combined form) of sodium and aluminum, usually including cryolite or other fluorides. The aluminum, except for its fluoride, carbide and nitride forms, is in considerable part present as aluminum oxide (alumina) and in some part as metal. Thus the bath ingredients, which are mainly cryolite (sodium aluminum fluoride) and alumina, with minor quantities of other salts such as fluorides of sodium and calcium as may be desired for special purposes, tend to be absorbed in their original or other combined states. Carbides and nitrides, notably of aluminum, are also formed during the aluminum reduction process, being so formed or deposited in the carbon lining. As is well known, a given pot will operate continuously for a rather long time, usually upwards of a year and often much longer, but eventually must be shut down, and have its carbon lining completely replaced.

Various procedures have heretofore been employed or proposed for the recovery of useful material from failed reduction cell linings. One such procedure, found particularly effective for recovery of useful carbon as well as fluoride and alumina values that can be reused in cells, is described in U.S. Pat. No. 3,635,408. In accordance with the process there disclosed, carbon lining removed after long, chemical-accumulating use in an aluminum reduction cell is crushed and hydrated with dry steam at a temperature insufficient to destroy the carbon, so that unwanted carbides and nitrides are eliminated and the lining material is conditioned for recovery of useful values, advantageously by classification thereafter into a coarse fraction providing carbon in reusable form and a fine fraction in which chemical material is reclaimed, such as alumina and fluorides suitable for use in the fused bath of a reduction cell.

As well be understood, carbon for potlining must be of relatively good quality and is therefore by no means inexpensive. Consequently, the process of the aforementioned patent is advantageous in recovering, from spent linings, carbon suitable for reuse in potlinings, i.e. as a substitute for conventional carbon lining material such as electrically calcined anthracite, kiln calcined anthracite, and metallurgical coke. Specifically, the recovered carbon may be used, either alone or in mixture with a proportion of conventional carbon lining materials such as those just mentioned, to constitute a carbonaceous aggregate (in suitable divided form) suitable for prebake blocks and monolithic linings. Desirable economy is achieved by the substitution of recovered carbon for some or all of the conventional new carbon material in such an aggregrate.

In accordance with conventional procedure, the aggregate comprising the recovered carbon (alone, or in mixture with new carbon material) is mixed with a conventional binder such as coal tar pitch, the binder constituting e.g. 16% of the mix, and baked to form hardened lining bodies. Although the recovered carbon contains residual contaminant chemicals, derived from the cell bath during its prior use in a reduction cell lining, the resultant bodies are found fully suitable for use as cell linings.

As stated, the dry-steam hydration procedure of the aforementioned patent is highly effective in providing a good recovery both of reusable carbon and of chemicals for the bath, but other hydration operations may alternatively be employed to treat spent lining material for recovery of carbon as well as re-usable chemicals therefrom, the recovered carbon material being in each case characterized by reduced content of undesired chemicals, in particular carbides and nitrides, as compared with the initial spent lining material.

SUMMARY OF THE INVENTION

The present invention broadly embraces the discovery that highly satisfactory lining bodies for aluminum reduction cells can be made from an aggregate comprising carbonaceous material recovered by hydration of used aluminum reduction cell linings (i.e. an aggregate constituted of such material alone or in mixture with new carbon lining material) by mixing with the aggregate a binder material comprising an alkaline catalyzable furan binder. As used herein, the term "furan binder" refers to binder systems in chich furfuryl alcohol or furfural is one of the main constituents.

It is known that by adding a furan binder to an aggregate, and by supplying thereto an appropriate catalyst (which may be acid or alkaline, depending on the particular binder used), a catalytic polymerization of the furan binder occurs with the result that a hardened mass is formed. The present invention specifically involves the discovery that the contaminant chemicals present in recovered carbon as defined above (i.e. carbon recovered by hydration of aluminum reduction cell linings) act as a catalyst for alkaline-catalyzed furan binders so that upon mixture of such a binder with an aggregate comprising the recovered carbon, a self-hardening body is formed suitable for use in or as an aluminum reduction cell lining. That is to say, the furan binder polymerizes in the presence of the contaminant chemicals, without need for supply of any catalyst, and the mixture hardens (satisfactorily for lining use) without having to be baked at all.

Alkaline-catalyzed furan binders, suitable for practice of the present method, include furfural plus a phenol, furfural plus a ketone, and furfuryl alcohol plus an aldehyde and an amine. The furan binder may be mixed with a high-melting-point pitch e.g. blast furnace pitch, to form a binder material containing e.g. a ratio of furan binder to pitch, in parts by weight, between about 65:35 and about 50:50. This binder material is mixed with an aggregate comprising recovered carbon as defined above, to provide a mixture in which the binder material constitutes about 11% to about 14% (preferably about 12 – 13.5%) by weight.

In the practice of the present method, the binder material and aggregate may be mixed cold (i.e. at room temperature), shaped in suitable mold structure, and allowed to stand at room temperature for a period of time sufficient to effect complete curing. During this period, the furan binder is polymerized in the presence of the contaminant chemical content of the recovered carbon; it is presently believed that the contaminants which act as catalysts in this respect are or may include $NaF$, $Na_3AlF_6$, and $NaAlO_2$. In any event, fully effective catalytic action is achieved without supply of any catalyst, and a fully hardened block or other body, ready for use in an aluminum reduction cell lining, is thereby obtained without baking.

If the mixture is molded in block form, the resultant product may be used in the same manner as conventional prebake blocks to build up a lining. Alternatively, the mixture may be formed in situ as a monolithic mass, or a lining may be prepared which is monolithic in some places and made up of blocks in others.

In accordance with a further and particularly preferred feature of the invention, the recovered carbon is obtained by a process essentially as described in the aforementioned patent, i.e. by crushing used lining material from an aluminum reduction cell preferably to a size of less than about three-fourths inch, subjecting the crushed material to a dry steam hydration, e.g. at a steam pressure of about 15 to about 40 p.s.i. (gauge) and a temperature of about 250° to about 400°F for about four to about ten hours, or until carbides and nitrides in the used lining are substantially completely reacted and removed as gases and/or converted to desired chemicals, such reaction being accompanied by substantial disintegration of the lining material. At the conclusion of the hydrating step, the disintegrated material is screened, e.g. to separate a fine fraction smaller than one-sixteenth inch from a coarse fraction of particle size larger than one-sixteenth inch, the coarse fraction typically containing about 40 to about 90% by weight carbon, as well as residual contaminant chemicals. This coarse fraction is then employed as the recovered carbon in the aggregate in the method of the present invention. In a broader sense, however, the recovered carbon in the aggregate of the method of the invention may be obtained by treatment of used or spent potlining material with any suitable hydration procedure that removes undesired carbides and nitrides while leaving a substantial proportion of the carbon content of the material in re-usable form.

A particular advantage of the present method is that it provides reduction cell linings at reduced cost, as compared with linings prepared entirely from conventional new or fresh material. An additional advantage is that it usefully employs material which would otherwise constitute wastes, and which might indeed be a cause of environmental pollution if discarded. In particular, it is known that outdoor storage of scrapped potlinings may result in water pollution. The materials used come from replaceable sources, furan binders being produced from agricultural wastes and the carbon aggregate being produced from spent potlinings.

DETAILED DESCRIPTION

For purposes of illustration, and as representing a presently preferred embodiment of the invention, detailed reference will be made herein to preparation of a carbon aggregate comprising or incorporating carbonaceous material recovered from spent aluminum reduction cell linings by the method of the aforementioned U.S. Pat. No. 3,635,408. While one important purpose of that method is to recover, from spent lining material, chemicals such as fluorides and alumina suitable for introduction to a reduction cell bath, another very significant feature thereof is the recovery of carbon in form suitable for reuse in potlinings, with substantial elimination of undesired carbides and nitrides present in the spent linings.

The term "used aluminum reduction cell linings," as employed herein, refers to carbon linings (sometimes called cathode carbon), in monolithic and/or prebake block form, which have been employed in aluminum reduction cells for extended periods, i.e. in exposure to the cell bath typically containing cryolite and alumina, during electrolytic operation of the cell for production of aluminum metal, and which have in consequence absorbed substantial amounts of bath chemicals. In particular, the used linings herein contemplated are those which have deteriorated to the point of failure through such use, commonly after periods of use ranging upwardly of a year, and which have been broken out of the steel shell of a failed cell (after removal of the contained cell bath material) for replacement. In practice of the method of the above-cited patent, it is preferred to treat prebake block linings that have been in use for not more than about 2,400 days (very preferably not more than about 1,800 days) or monolithic linings that have been in use for not more than about 1,200 days.

As described in the above-cited patent, the used lining material is crushed e.g. to a particle size of less than three-fourths inch, to yield a product mainly comprising particles down to one-eighth inch. This crushed material is then subjected to a dry steam hydration, preferably using live steam at a pressure of about 15 to about 40 p.s.i. (gauge) and a temperature of about 250° to about 400°F for a period, typically about four to about 10 hours, sufficient to achieve effectively complete reaction of carbides and nitrides present in the material. This hydration is performed by placing the crushed material in a suitably confined vessel and introducing live steam thereto from an appropriate source, all as described in the above-cited patent, to which reference may be made for a description of preferred or exemplary details of operation and process conditions. During the hydration, ammonia and hydrocarbons are evolved, respectively, incident to reaction of the contained nitrides and carbides; cessation of such gas evolution is a useful practical indication of completeness of the hydration step. It is a particular feature of the method that the hydration is performed at temperatures maintained below any level that would cause any significant destruction of carbon.

In general, the used, i.e. failed or spent carbon lining material, treated as fragments in the hydrator, consists essentially of (a) carbon; (b) unwanted material of the class consisting of aluminum carbide and nitride; and (c) chemical material of the class consisting of fluoride and oxide of aluminum, sodium and calcium, with some hydroxides if the removed lining has been exposed to hydration by the atmosphere for some time. Other chemical values may be present in minor amount, including aluminum metal, but substances from the above classes represent the principal materials of significance herein, one or more of which may be found in the failed lining. As will also be appreciated, the reactions to which aluminum carbide and nitride are subjected by the steam treatment, yield further quantities of aluminum hydroxide (alumina hydrate) or conceivably oxide, which thus in effect augment the defined class (c) of other chemical materials originally present in the lining.

When the hydration is completed, the treated lining material (as withdrawn from the vessel) is found to be sonsiderably disintegrated, particularly in yielding a greater amount of fine particles, and is classified by screening into a fine fraction and a coarse fraction. In a convenient or preferred example, the screening is performed so that the fine fraction is minus one-sixteenth inch and the coarse fraction is plus one-sixteenth inch. It is found that the fine (− one-sixteenth inch) fraction contains useful quantities of fluorides and alumina or alumina hydrate, together with some carbon, and may be supplied to the bath of an aluminum reduction cell (advantageously after burning out the carbon of the fines) for supply of these chemicals thereto.

The coarse (+ one-sixteenth inch) fraction constitutes recovered carbon, free (as is also the fine fraction) of carbides and nitrides at least in deleterious amounts, and suitable for use in reduction cell lining bodies. In general, the particles or pieces of this coarse fraction consist, on the average, of at least 40% carbon, usually amounts of at least 50 up to 90% (all composition percentages here and elsewhere herein being expressed as percent by weight). The remaining content of the coarse fraction is residual contaminant material from the used lining, and may consist of retained fluorides (e.g. up to 20%) and other chemicals (essentially oxides or hydroxides, mostly of aluminum, e.g. up to 30%), the total chemicals being in all cases the balance over the carbon content. In a typical example, containing about 46% by weight residual chemicals, this recovered carbon (i.e. incorporating residual chemical material) has an alkalinity corresponding to 5% NaOH. The alkalinity of the recovered carbon is dependent on the relative amounts of carbon and residual contaminant matter present therein. The relative quantities of carbon and chemicals depend on the age and nature of the lining being processed, the higher proportions of carbon being found in material from newer pots and/or prebake lined pots.

In one example (set forth in the above-cited patent) of treatment of used prebake lining from an aluminum reduction cell that had been in service 721 days, the composition of the used lining as removed from the pot was as follows: 0.3% nitrides, 1.5% carbides, 39% other chemicals, 59% carbon. After hydration and classification, the coarse (+16 mesh) fraction of the treated material was found to contain approximately 53% carbon, the balance being essentially fluorides, alumina and alumina hydrate.

In other examples, recovered carbon (herein defined as carbonaceous material obtained by hydration of used aluminum reduction cell linings) from linings having an age (period of service) ranging from 921 to 3,200 days, was found to have the following chemical analysis in percent by weight:

|  | C | Na | F | Ca | Ash | $Al_2N_2$ (1) | (2) | $Al_4C_3$ (1) | (2) |
|---|---|---|---|---|---|---|---|---|---|
| Typical | 54.0 | 12.0 | 13.0 | 2.0 | 40.0 | <2.0 | <0.1 | <2.0 | <0.1 |
| High | 62.9 | 16.0 | 15.2 | 3.6 | 46.5 | 1.8 | 0.3 | 4.5 | 0.2 |
| Low | 44.2 | 4.5 | 9.3 | 0.8 | 35.4 | 0.1 | <0.1 | 0.1 | <0.1 |

(1) before hydration
(2) after hydration

Properties of this recovered carbon, in the lastmentioned examples, were as follows:

|  | Density ($g/cm^3$) | Porosity (%) | Mean Crystallite Thickness $L_cA$ | Interlayer Spacing A |
|---|---|---|---|---|
| Typical | 2.35 | 11.7 | 376 | 3.365 |
| High | 2.38 | 14.1 | 440 | 3.370 |
| Low | 2.24 | 10.7 | 352 | 3.360 |

Preferably, for use as an aggregate for making blocks or other lining bodies for use in lining an aluminum reduction cell, the recovered carbon (e.g. the coarse, or + one-sixteenth inch, fraction of the hydrated used lining material) is further ground as necessary to provide a desired paticle size distribution such as the following, which may be taken as exemplary of a suitable particle size range for such aggregates:

| Tyler Mesh | Percent of Cumulative Weight |
|---|---|
| 3 | 9–10 |
| 4 | 21–24 |
| 6 | 25–37 |
| 8 | 27–44 |
| 10 | 29–45 |
| 14 | 34–45 |
| 20 | 39–47 |
| 28 | 49–52 |
| 35 | 57–58 |
| 48 | 63–64 |
| 65 | 70–71 |
| 100 | 77–78 |
| 150 | 81–82 |
| 200 | 84–86 |

In explanation of the foregoing table, the percentage figure given for each mesh size represents the percent, of the total aggregate, that would be retained on a screen of the stated mesh size; thus, for example, 34 to 45% of the total aggregate is +14 mesh.

The present method, as stated, contemplates use of an aggregate comprising recovered carbon (i.e. used aluminum reduction cell lining material, treated as by the above-described hydration, and containing residual contaminants in the nature of fluorides, oxides, etc., all as set forth above) in making blocks or other bodies, for lining aluminum reduction cells. In such aggregate, there may be present a substantial portion of fresh carbon lining material, e.g. such as is conventionally used in the fabrication of reduction cell linings; that is to say, the recovered carbon may, if desired, be mixed with fresh carbon material (for example electrically calcined anthracite, kiln calcined anthracite, or metallurgical coke) to constitute the aggregate, which is ground as necessary to provide a desired particle size distribution such as that set forth above by way of example. In any event, at least a substantial part (i.e. at least about 50%) of the particulate carbonaceous aggregate consists of the recovered carbon from used aluminum reduction cell linings and thus contains the residual contaminants introduced thereto by such prior use.

In accordance with the invention, and as a particular feature thereof, there is mixed, with the above-described carbonaceous aggregate, binder material comprising an alkaline-catalyzable furan binder, e.g. in mixture with a high-melting-point pitch such as blast furnace pitch. Furan binders as contemplated herein, suitable for use in the present invention, include the following:

a. furfural plus a phenol; specific example: furfural and phenol;
b. furfural plus a ketone; examples: furfural and acetone, or furfural and cyclohexanone;
c. furfuryl alcohol plus an aldehyde and an amine; specific example: furfuryl alcohol and formaldehyde and urea.

One currently commercially available alkaline-catalyzable furan binder, having utility in the present method, is that obtainable from Quaker Oats Company under the commercial or trade designation "QX-362." It is presently believed that the principal constituents of this binder are furfural and cyclohexanone, although some furfuryl alcohol may also be present.

In furan binders of the type herein contemplated, the binder constituents (e.g. furfural and cyclohexanone) react in the presence of an alkaline catalyst to form a resin that, in mixture with an aggregate, acts as a binder providing a hardened body. The catalytic polymerization reaction involved requires no external application of heat. In the present invention, it is found (contrary to the usual situation of formation of resin-aggregate bodies from such binders) that no catalyst need be supplied to the binder-aggregate mixture, owing to the inherent alkalinity of the recovered carbon material, i.e. because the residual contaminants inherently present in the recovered carbon of the aggregate (owing to previous use of the recovered carbon in aluminum reduction cell linings) themselves constitute the catalyst required for the resin-forming reaction.

Thus, stated broadly, the invention contemplates forming lining bodies for aluminum reduction cells by mixing a carbonaceous aggregate comprising recovered carbon and binder material comprising an alkaline-catalyzable furan binder, without adding thereto any catalyst, and curing the mixture (e.g. by allowing the mixture to stand at room temperature) for reacting the binder in the presence of contaminants in the recovered carbon as catalyst, to produce a hard, solid carbon body. The aggregate, as stated, may include new carbon material (up to about 50% by weight of the total aggregate) in mixture with the recovered carbon; and the binder, which constitutes a minor proportion of the total binder-aggregate mixture, may include a high-melting-point pitch such as blast furnace pitch together with the furan binder. Bodies made by this method, i.e. without addition of catalyst and also without baking (as has heretofore been customary for formation of lining bodies), develop physical properties fully satisfactory to enable their use as or in aluminum reduction cell linings.

This method of the invention may be further described, for purposes of specific illustration, with reference to the manufacture of sidewall blocks for reduction cells, i.e. blocks (corresponding to conventional prebake blocks) which are preformed and used in constructing side wall linings for aluminum reduction cells. In a suitable mixture for making such blocks in accordance with the present invention, using an aggregate comprising recovered carbon and having a particle size distribution e.g. as specified above, the binder material (furan binder and pitch) may constitute about 11% to about 14% (preferably about 12 – 13.5%, a value of 12.5% being presently especially preferred) of the total binder-aggregate mixture. The ratio of furan binder to pitch in the binder material, in parts by weight, may typically be between about 65:35 and about 50:50, a value of about 60:40 being presently especially preferred. The pitch used may be blast furnace pitch, and the aforementioned "QX-362" material may be used as the furan binder. The stated ranges of binder content of the aggregate-binder mixture, and of furan binder to pitch ratio, are advantageous for avoidance of undue susceptibility of produced sidewall blocks to structural damage before curing, or to cracking when rapidly heated.

More generally, references herein to "high melting point pitch" are exemplified by pitch having a softening point of e.g. about 160°C. In this connection it may be explained that in present practice, it is preferred to provide the pitch in finely divided (−48 mesh size) form for mixture with other ingredients of the aggregate-binder mixture, to ensure satisfactory distribution of the pitch throughout the mix and thorough contact with the furan binder. Use of high melting point pitch enables grinding of the pitch to the desired size without agglomeration of the ground particles. An important function of the pitch is to prevent excessive structural delicacy of the produced blocks before curing.

In an illustrative procedure, 1,800 lbs. of aggregate and 270 lbs. of binder material (162 lbs. of furan binder and 108 lbs. of pitch) are used to make ten solid sidewall blocks each having a final dimension of 22 inches × 16 inches × 6½ inches. The aggregate and blast furnace pitch are first mixed cold (at room temperature) for ten minutes in a suitable mixer. The furan binder is then added to the mixer, and the mixing operation is continued for 40 minutes more. When mixing is completed, the mixture is deposited in suitable oil-lubricated molds (which may, if desired, be preheated e.g. to about 40°C) and subjected to jolting by a conventional jolting procedure, e.g. for a period of about 10 minutes. Thereafter, the blocks are gently removed from the molds and allowed to stand on a plane surface at room temperature for a period of time sufficient to effect complete curing, e.g. about one week. The blocks are then trimmed to final dimensions, and dried with an air jet.

Blocks made by the described method exhibit physical properties at least comparable to those of conventional prebake blocks. The density of several blocks prepared by procedures generally similar to those set forth above ranged from 1.93 g/cm$^3$ to 2.06 g/cm$^3$. Two linings made of blocks prepared by the foregoing procedure were still in service, in aluminum reduction cells, after eight months and three months respectively; cell operation was good, with no indication of excessive side erosion from freeze profile measurements.

It is to be understood that the invention is not limited to the features and embodiments hereinabove specifically set forth, but may be carried out in other ways without departure from its spirit.

I claim:
1. A method of making lining bodies for aluminum reduction cells, comprising adding binder material comprising an alkaline-catalyzable furan binder to a carbonaceous aggregate comprising carbon material recovered from used, chemical-containing carbon lining of an aluminum reduction cell, said carbon material containing residual contaminant material from the used lining, for reacting said furan binder with said residual contaminant material acting as catalyst to produce a hardened carbon body, said binder material being added in a proportion equal to between about 11% and about 14% of the total weight of the aggregate and the binder, and consisting essentially of furan binder and pitch respectively present in relative proportions, by weight, between about 65:35 and about 50:50, said furan binder consisting essentially of furan binder constituents that react in the presence of an alkaline catalyst to form a resin that, in mixture with an aggregate, acts as a binder providing a hardened body, said furan binder being selected from the class consisting of a furfural plus a phenol, furfural plus a ketone, and furfuryl alcohol plus an aldehyde plus an amine, and said pitch being a high melting point pitch.

2. A method according to claim 1, wherein said pitch is blast furnace pitch.

3. A method according to claim 1, wherein said aggregate further comprises fresh carbon in mixture with said recovered carbon material, and wherein said recovered carbon material constitutes at least about 50% of said aggregate.

4. A method of lining an aluminum reduction cell, comprising
 a. intimately mixing a minor proportion of binder material including an alkaline-catalyzable furan binder with a major proportion of a carbonaceous aggregate comprising carbon material recovered from used, chemical-containing carbon lining of an aluminum reduction cell, said carbon material containing residual contaminant material from the used lining, for reacting said furan binder with said residual contaminant material acting as catalyst; and
 b. disposing a body of the mixed aggregate and binder in an aluminum reduction cell as a lining therefor;
 c. said binder material being added in a proportion equal to between about 11% and about 14% of the total weight of the aggregate and the binder, and consisting essentially of furan binder and a high melting point pitch respectively present in relative proportions, by weight, between about 65:35 and about 50:50, said furan binder being selected from the class consisting of furfural plus a phenol, furfural plus a ketone, and furfuryl alcohol plus an aldehyde plus an amine.

5. A method according to claim 4, wherein the disposing step comprises
 i. maintaining the mixed aggregate and binder in intimate mixture, in plural discrete formed bodies, for a period of time sufficient for reaction of the furan binder as aforesaid to harden the bodies as blocks; and
 ii. assembling the blocks in a lining for an aluminum reduction cell.

6. A method of making lining bodies for an aluminum reduction cell, comprising
 a. hydrating used, chemical-containing carbon lining of an aluminum reduction cell for recovering therefrom carbon material containing residual contaminant material from the used lining; and
 b. adding, to a major proportion of an aggregate comprising said carbon material, a minor proportion of binder material comprising an alkaline-catalyzable furan binder or resin-forming reaction of said furan binder in the presence of said residual contaminant material as catalyst, to harden the mixture of aggregate and binder material;
 c. said binder material being added in a proportion equal to between about 11% and about 14% of the total weight of the aggregate and the binder, and consisting essentially of furan binder and a high melting point pitch respectively present in relative proportions, by weight, between about 65:35 and about 50:50, said furan binder being selected from the class consisting of furfural plus a phenol, furfural plus a ketone, and furfuryl alcohol plus an aldehyde plus an amine.

7. A method according to claim 6, wherein the hydrating step includes treating fragments of said used lining in a confined region with dry steam at a temperature insufficient for substantial reaction of carbon in the region, for a sufficient time to exert disintegrating influence on said used lining and to convert same into form capable of treatment for classification by particle size to yield a fine fraction containing chemical material derived from the chemical content of the used lining and a coarser fraction of material which contains carbon.

8. A method according to claim 7, further including separating said coarser fraction from said fine fraction, said coarser fraction constituting said carbon material.

9. A method of making lining bodies for aluminum reduction cells, comprising a. treating used carbon lining of an aluminum reduction cell that has contained a molten bath, said used lining containing carbon, unwanted material of the class consisting of aluminum carbide and nitride, and chemical material of the class consisting of fluoride, oxide and hydroxide of aluminum, sodium and calcium, by crushing said used lining, treating the crushed lining in a confined region with dry steam for converting the unwanted material to gaseous product and to material which is of the class of aluminum oxide and hydroxide and which augments said chemical material in the crushed lining, while maintaining the crushed lining at a temperature insufficient for substantial reaction of carbon in the region and while withdrawing said gaseous product from the region, to yield a substantially dry, particulate used lining product classifiable by particle size into a fine fraction, which contains chemical material of the aforesaid class, and a coarser fraction, which contains carbon in amount of between about 40% and about 90% by weight of its composition and also contains residual contaminant material from the used lining;

b. separating said coarser fraction from said fine fraction, for forming an aggregate comprising said coarser fraction;

c. adding, to a major proportion of said aggregate, a minor proportion of binder material comprising an alkaline-catalyzable furan binder; and d. maintaining, in a desired shape, said aggregate and said binder material in intimate mixture for resin-forming reaction of said furan binder in the presence of said residual contaminant material, to harden the mixture of aggregate and binder material as a body having the desired shape;

e. said binder material being added in a proportion equal to between about 11% and about 14% of the total weight of the aggregate and the binder, and consisting essentially of furan binder and a high melting point pitch respectively present in relative proportions, by weight, between about 65:35 and about 50:50, said furan binder being selected from the class consisting of furfural plus a phenol, furfural plus a ketone, and furfuryl alcohol plus an aldehyde plus an amine.

10. A method as defined in claim 9, wherein said pitch is blast furnace pitch.

11. A method as defined in claim 10, wherein said aggregate further includes fresh carbon material in an amount of not more than about 50% by weight of said aggregate.

12. A method as defined in claim 10, wherein said binder material consists essentially of said furan binder and said pitch in relative proportions, by weight, of about 60:40, said binder material being added to said aggregate in an amount equal to about 12.5% of the combined weight of binder and aggregate.

13. A method according to claim 4, wherein said pitch is a pitch having a melting point sufficiently high to enable grinding of the pitch in solid state to −48 mesh particle size without agglomeration of the resultant ground pitch particles.

14. A method according to claim 6, wherein said pitch is a pitch having a softening point of at least about 160°C.

* * * * *